(12) United States Patent
Funck (10) Patent No.: US 8,282,036 B2
(45) Date of Patent: Oct. 9, 2012

(54) MULTI WING AIRCRAFT

(76) Inventor: Stephen H. Funck, Baltimore, MD (US)

( * ) Notice: Subject to any disclaimer, the term of this patent is extended or adjusted under 35 U.S.C. 154(b) by 237 days.

(21) Appl. No.: 12/653,489

(22) Filed: Dec. 15, 2009

(65) Prior Publication Data

US 2011/0168832 A1    Jul. 14, 2011

(51) Int. Cl.
*B64C 1/00* (2006.01)

(52) U.S. Cl. .................. 244/36; 244/102 SS; 244/119; 244/137.1

(58) Field of Classification Search .................. 244/12.1, 244/36, 117 R, 119, 48, 102 SS, 137.1
See application file for complete search history.

(56) References Cited

U.S. PATENT DOCUMENTS

| | | | |
|---|---|---|---|
| 1,758,498 A | 5/1930 | Burnelli | |
| 2,194,596 A * | 3/1940 | Henter | 244/13 |
| 2,224,641 A | 12/1940 | Burnelli | |
| 2,380,290 A | 7/1945 | Burnelli | |
| D162,517 S | 3/1951 | Burnelli | |
| 2,616,639 A * | 11/1952 | Burnelli | 244/36 |
| 2,685,420 A | 8/1954 | Burnelli et al. | |
| D198,610 S | 7/1964 | Burnelli | |
| D199,510 S | 11/1964 | Burnelli | |
| 4,566,657 A | 1/1986 | Grow | 244/90 |
| 5,082,204 A | 1/1992 | Croston | 244/126 |
| 6,098,922 A | 8/2000 | Hahl | 244/36 |
| 6,834,832 B2 | 12/2004 | Jamgarov | 244/117 |

OTHER PUBLICATIONS

"The Burnelli Lifting Body", http:www.burnelli.com/wp/history.
"Ground Effect and WIG Vehicles," http://www.aerospaceweb.org/question/aerodynamics/Q0130.shtml.

* cited by examiner

*Primary Examiner* — Tien Dinh
*Assistant Examiner* — Nicholas McFall
(74) *Attorney, Agent, or Firm* — Larry J. Guffey (57) ABSTRACT

A multi-wing, airfoil fuselage aircraft that is capable of flying in a ground-effect mode includes a main airfoil fuselage wing, a fin that extends vertically from this wing, a pivot mount that is affixed to the fin, an auxiliary wing that connects to the pivot mount so as to allow its angle of attack to be adjusted and changed during different flight conditions, a main landing gear, an adjustable-length, stabilizing landing gear, assorted control surfaces that are movably affixed to the auxiliary wing and fin, and a ground-effect control system that is adapted to control the operation and movement of these control surfaces when the aircraft is flying in a ground-effect mode of flight.

20 Claims, 6 Drawing Sheets

MULTI WING AIRCRAFT

BACKGROUND OF THE INVENTION

1. Field of the Invention

This invention relates to multi-wing aircraft, especially those whose fuselages have a lift-providing, airfoil shape (i.e., airfoil fuselage aircraft). More particularly, this invention relates to a very heavy payload, multi-wing aircraft that is especially adapted to operate: (a) at fuel consumption rates per pound of materials transported that are comparable to those achievable with intercontinental container ships and less than those achievable by utilizing trucking to reach inland destinations, but (b) with transport delivery times that are less than one-fifth those of intercontinental container ships and less than one-half those of trucking, and (c) with environmental emissions per pound of materials transported that are a fraction of those now being emitted by intercontinental container ships. Such an aircraft can greatly reduce the shipping costs of both imported products and those products that must travel many miles to distant inland markets.

2. Description of the Related Art

Patents for airfoil fuselage aircraft have been in existence for more than seventy years. See, for example, U.S. Pat. Nos. 1,758,498, 2,224,641, 2,380,290, 2,616,639, 2,685,420, 4,566,657, 5,082,204, 6,098,922, 6,834,832, D162,517, D198,610 and D199,510. Among these patents are those that pertain to the "Bernoulli Lifting Body," see http://www.burnelli.com/wp/history. Despite these patents and apparent significant efforts to develop airfoil fuselage aircraft, few prototypes of such aircraft ever appear to have been constructed and extensively flown.

The positive attributes of such aircraft would seem to imply that their greatness usefulness might be as transport vehicles in heavy payload applications, where their positive attributes include: the added lift generated by an airfoil fuselage enables such an aircraft to handle greater payloads, and such greater payload capabilities offer the hope for them to operate more fuel efficiently (i.e., have lower fuel consumption rates per pound of materials transported).

However, the operational performance improvements, achievable heretofore by utilizing airfoil fuselage technology, etc. to develop new and improved cargo transport aircraft, appear not to have been of sufficiently large magnitude so as to justify air cargo shippers changing from their present fleets of aircraft.

Meanwhile, some of the more interesting attempts to create more fuel efficient, inter-continental, over-the-ocean, heavy transport aircraft seem to be centered on the development of what are known as "ground effect" (ground-effect) or "wing-in-ground (WIG)" aircraft. What makes these aircraft so unique is that they primarily are designed to fly only a few meters over the ground/ocean in order to take advantage of the fuel efficiency savings that are reportedly up to thirty five percent less than those for comparable aircraft flying at high altitudes. For more information on such aircraft, see "The WIG Page" at http://www.se-technology.com/wig/index.php.

Perhaps prior cargo transport, aircraft developers have not been sufficiently ambitious in their development efforts. What if, rather than trying to just replace current cargo aircraft with new and improved versions, cargo transport aircraft developers were to seek to create an entirely new type of airfoil fuselage aircraft that could capture more of the transport market for: (a) intercontinental, over-the-ocean container shipments (i.e., not just that small percentage of the market which is willing to pay the much higher per pound shipping cost for overnight delivery of air-freight as opposed to the lower per pound shipping costs for container ship transport whose trip duration can easily take several days), and (b) truck shipping to distant inland markets.

With the average fuel consumption rate per pound of materials transported by current over-night, air-freight deliveries estimated to be more than forty times that of container ship transport, the task of developing an entirely new type of multi-wing, airfoil fuselage aircraft that can in any way compete with and even take transport market share away from container ships seems like a very daunting task.

However, container transport shipping does have some serious challenges and problems that appear to be escalating rapidly and which could soon drastically, adversely impact their operating cost. For example, container ships may eventually have to install costly air scrubbing devices to further clean up their current noxious emissions. It is estimated that the annual emissions of supposed cancer and asthma-causing chemicals from one giant container ship is equivalent to that of 50 million cars. Consequently, 15 of the world's biggest container ships may now emit as much pollution as all the world's estimated 760 million cars. See "Health Risks of Shipping Have Been Underestimated", http://www.guardian.co.uk/environment/2009/apr/09/shipping-pollution. Meanwhile, the environmental emissions per pound of materials transported by a properly designed, heavy payload, multi-wing, comparatively slow-moving, airfoil fuselage aircraft would be expected to be a fraction of those now being emitted by intercontinental container ships. Thus, there would appear to be a need and an opportunity for the unique aircraft disclosed herein.

SUMMARY OF THE INVENTION

Recognizing the potential business opportunities that would exist for a new type of multi-wing, airfoil fuselage aircraft that could compete with and even take transport market share away from intercontinental container ships and long-distance trucks, the present invention is generally directed to developing such an aircraft.

In accordance with the present invention, a multi-wing aircraft that could compete with and take market share away from container ships and long-distance trucks has an airfoil fuselage or main wing and is capable of flying in a ground-effect mode. This aircraft includes a fin that extends vertically from its main wing, a pivot mount that is affixed to the fin, an auxiliary wing that connects to the pivot mount so as to allow the angle of attack of the auxiliary wing to be adjusted and changed during different flight conditions, a main landing gear, an adjustable-length, stabilizing landing gear, assorted control surfaces that are movably affixed to the auxiliary wing and fin, and a ground-effect control system that is adapted to control the operation and movement of these control surfaces when the aircraft is flying in its ground-effect mode.

Thus, there has been summarized above, rather broadly and understanding that there are other preferred embodiments which have not been summarized above, the present invention in order that the detailed description that follows may be better understood and appreciated. There are, of course, additional features of the invention that will be described hereinafter and which will form the subject matter of the claims to this invention.

DESCRIPTION OF THE PREFERRED EMBODIMENT

Before explaining the present invention in detail, it is to be understood that the invention is not limited in its application to the details of construction and to the dimensions and arrangements of the components set forth in the following description or illustrated in the drawings. For example, wind tunnel and prototype testing of the aircraft shown below will invariably lead to design modifications that are within the engineering and design extrapolations of the work shown herein and therefore within the scope of the present invention. Additionally, it is to be understood that the phraseology and terminology employed herein are for the purpose of description and should not be regarded as limiting.

The multi-wing aircraft of the present invention, the "ConcordLift™" aircraft, is optimized to compete with ocean-going container ships and long distance trucks.

The "ConcordLift™" derives its name because its unique wings and landing gear work in concord/harmony to lift and lower the aircraft's exceedingly large payloads.

To fully comprehend the intended usefulness and impact of the present invention, it might be better to consider the present invention as a flying version of sea borne shipping. It is optimized to compete with both ocean-going container ships and, when delivering goods to interior or inland destinations, long distance trucks. By allowing goods to be delivered inland at the lower cost/mile of sea borne shipping, the present invention could have a significant impact on the pricing of goods at inland locations and thus the economies of such regions.

To achieve its desired operating efficiency goals, the aircraft of the present invention has been designed so that it can: (a) in addition to normal high altitude flight, fly for extended periods of time very close to the ground/ocean or earth's surface so that it take advantage of the energy saving features of "ground effect" flying, and (b) fly much slower than typical transport aircraft (e.g., 120-150 mph versus 550 mph)—i.e., relatively low speeds) in order to achieve the lower drag forces on its surface that consequently lead to its lower power consumption requirements. Thus, the aircraft of the present invention is expected to fly slower and below commercial jet traffic—flying in ground effect across oceans, while having the capability to climb above costal ranges to reach interior airports; scheduling its takeoffs and landings to occur when airport traffic is otherwise at a minimum.

Figure 1A:
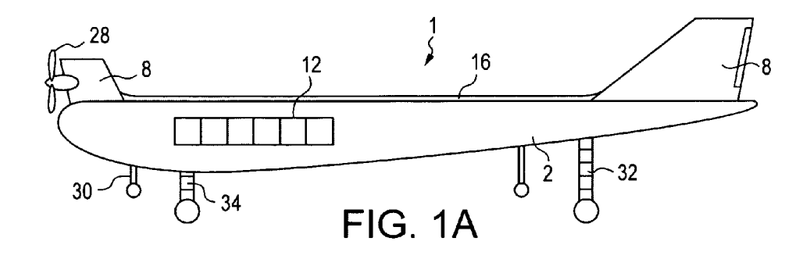
FIGS. 1A-1C show, respectively, side, perspective and front views of the multi-wing, airfoil fuselage aircraft of the present invention.
Figure 1B:
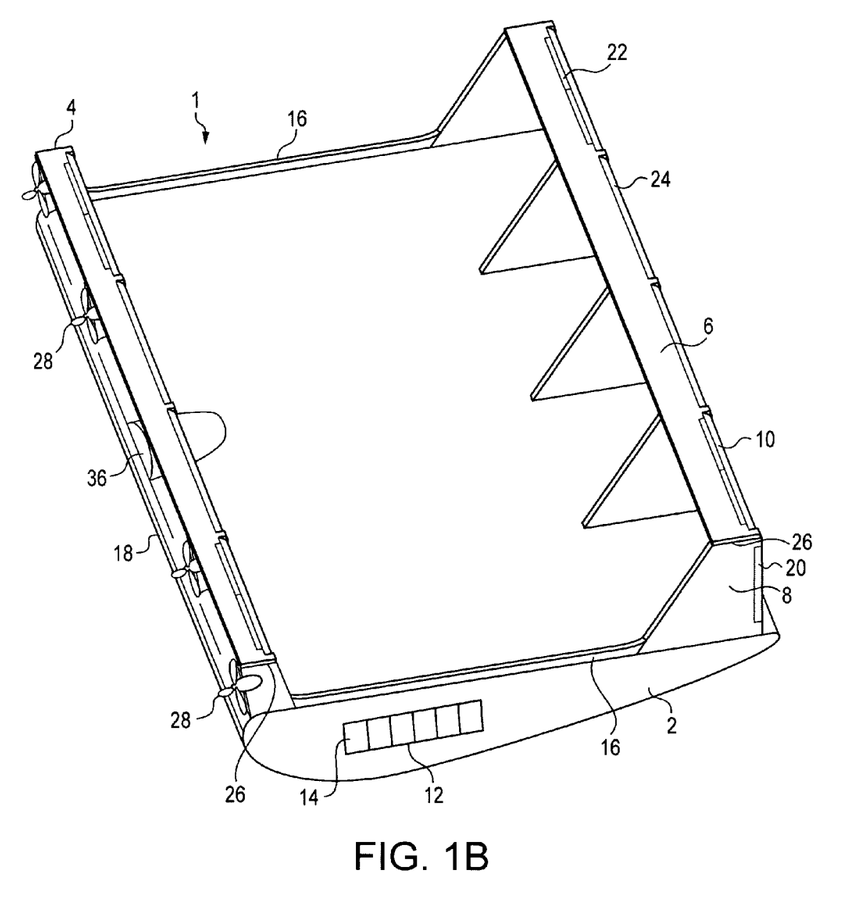
Figure 1C:
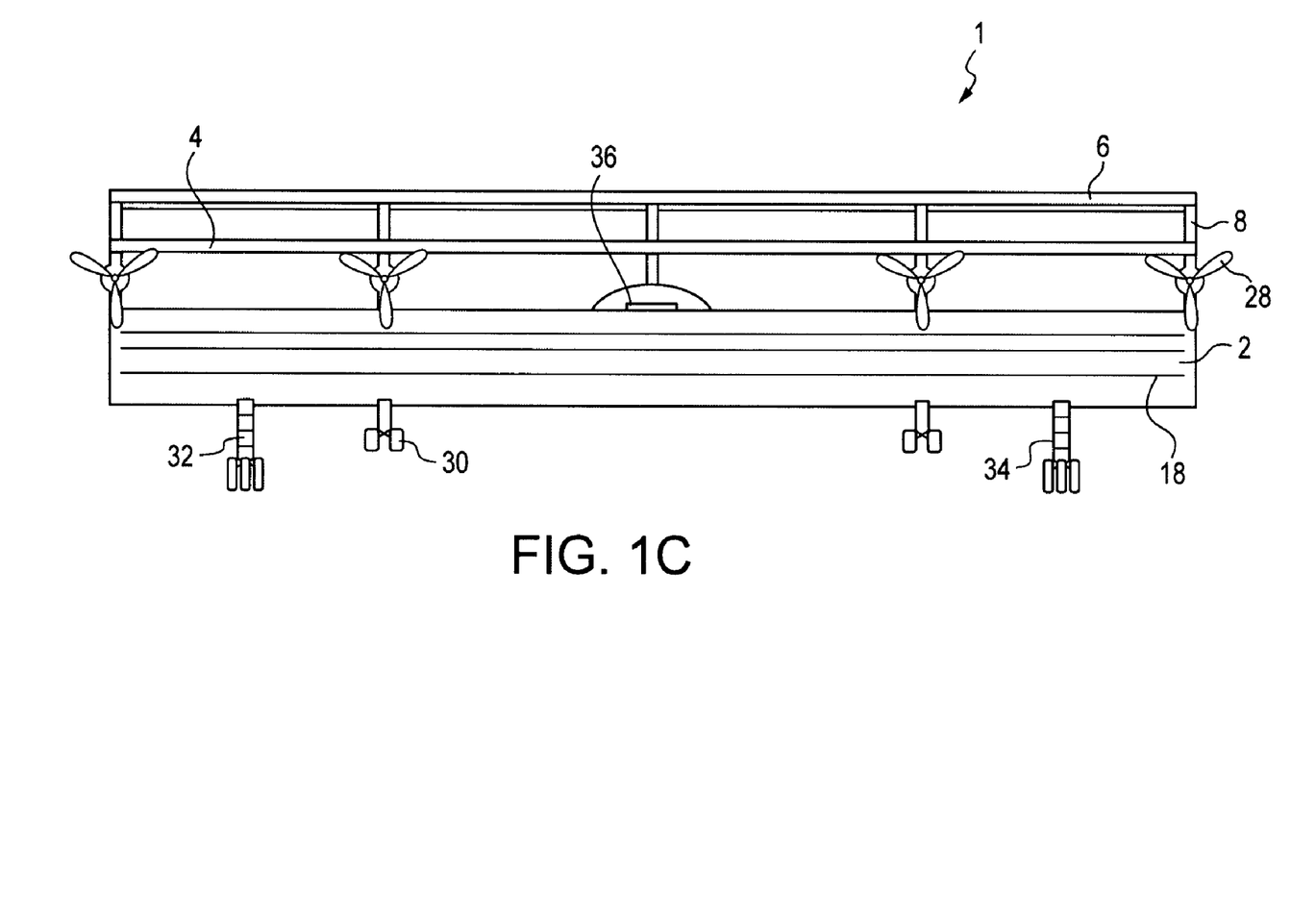

As shown in FIGS. 1A-1C, the present invention in the form of a multi-wing, airfoil fuselage aircraft 1 is scaled so as to allow it to be used on existing major airport runways that measure approximately 3,500 m by 50 m. It is seen to consist of a main, span-loaded, cargo flying, wing or airfoil fuselage 2 that has a centerline and top, bottom, front, rear and wing tip surfaces, with these top and bottom surfaces configured so as to yield a specified camber for this airfoil fuselage. The aircraft also has a fore 4 and an aft 6 auxiliary wing that are connected to the main wing 2 or fuselage by vertical fins 8.

Typical dimensions for this main wing 2 or airfoil fuselage are a span of approximately 80 m (i.e., just slightly larger than the span of today's largest aircraft so that the present invention can use existing runways), a chord of 50 m and a quite large thickness of 5 m. Thus, this main wing's dimensions are quite unusual since they mean that this main wing has a comparatively low Aspect Ratio, AR (i.e., for a rectangular airfoil: AR=span/chord; main wing has an AR~1.6). This can be problematic since such wings are known to be more susceptible to roll stability problems, especially in "ground effect" flying, including take-off and landing.

Figure 2:
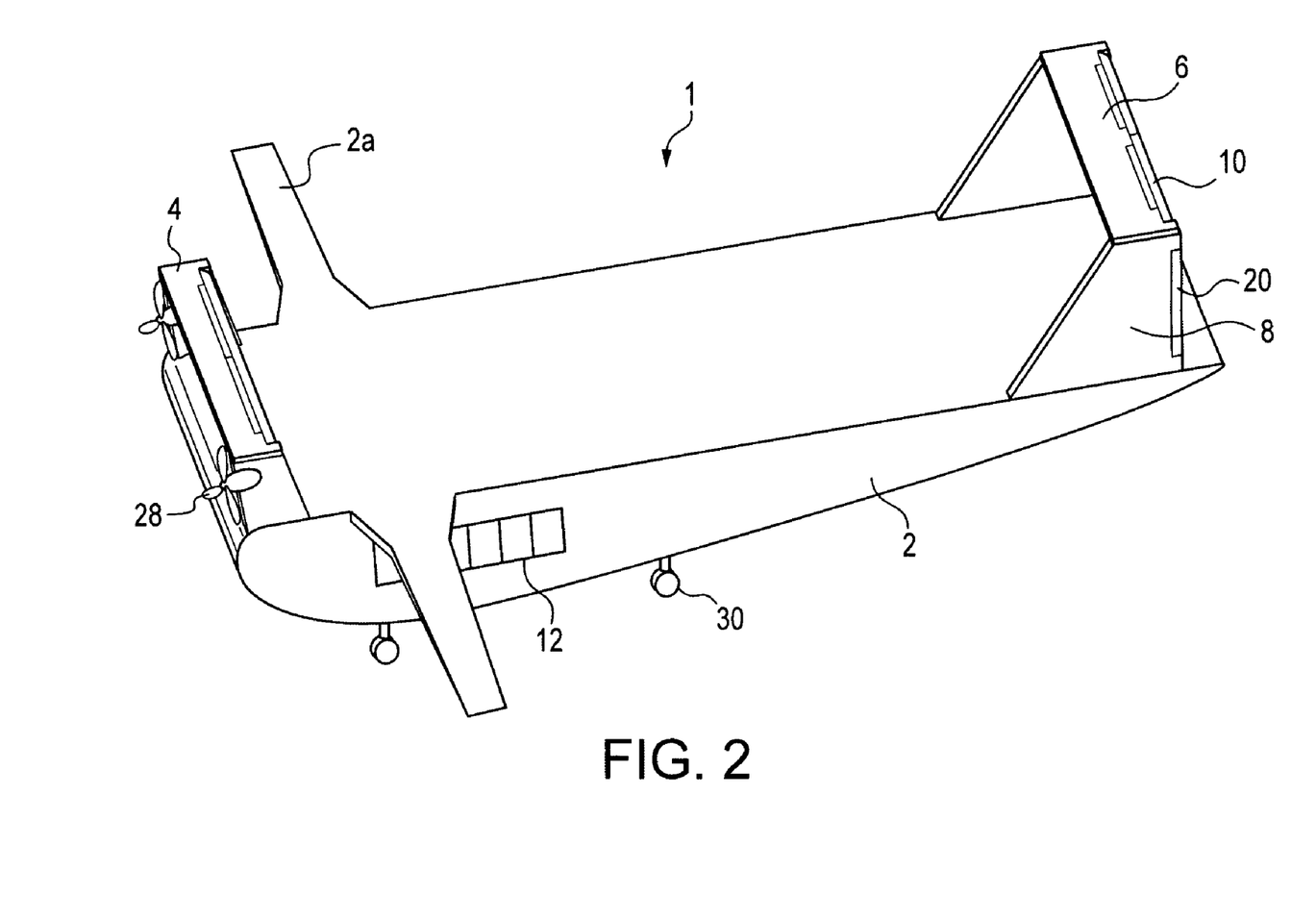
FIG. 2 shows a perspective view of a narrower, multi-wing, airfoil fuselage aircraft similar to that shown in FIG. 1 but which has main wing extensions and is designed for use with smaller payloads and shorter runways.
Figure 3:
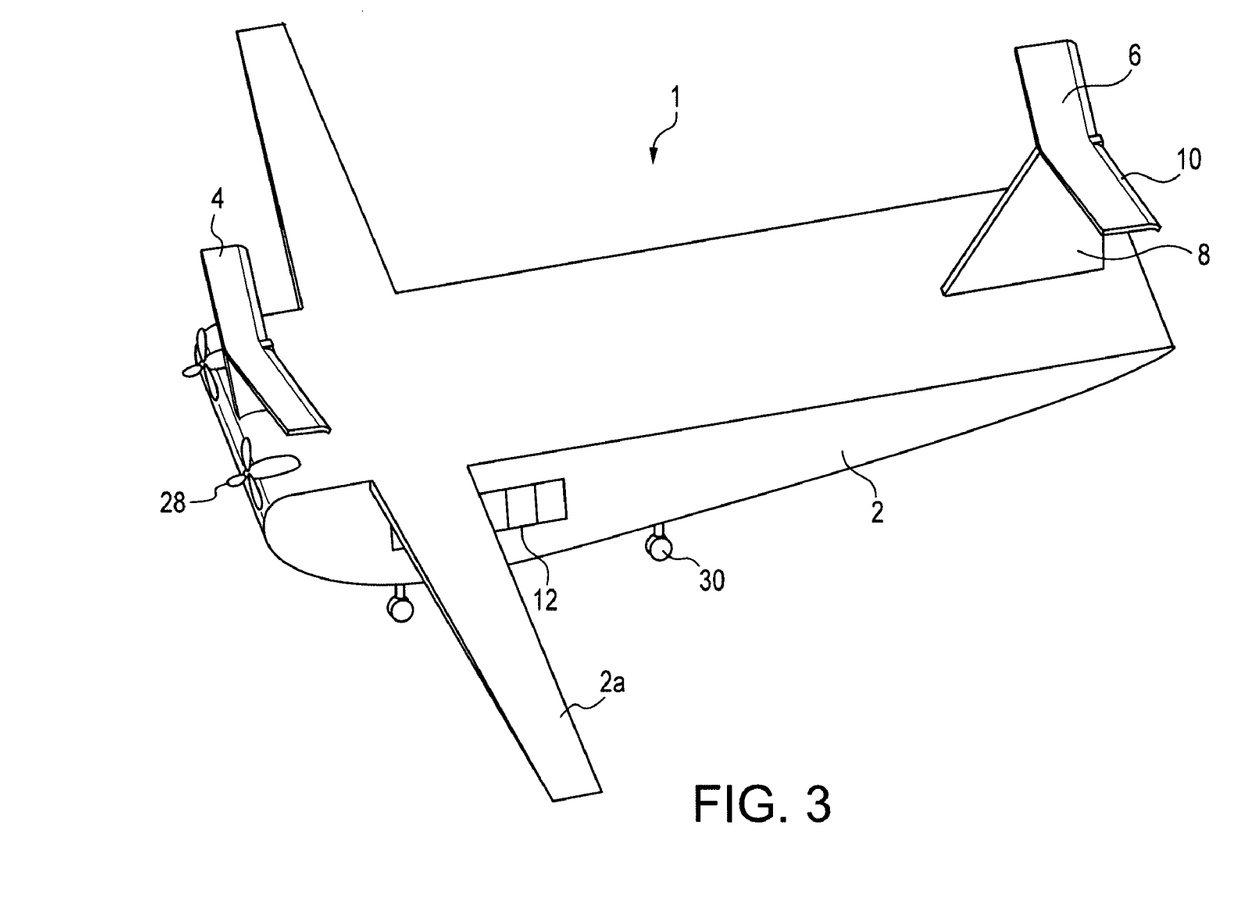
FIG. 3 shows a perspective view of another multi-wing, airfoil fuselage aircraft that is similar to that shown in FIG. 2 but which has its auxiliary wings mounted in a different manner.
Figure 4:
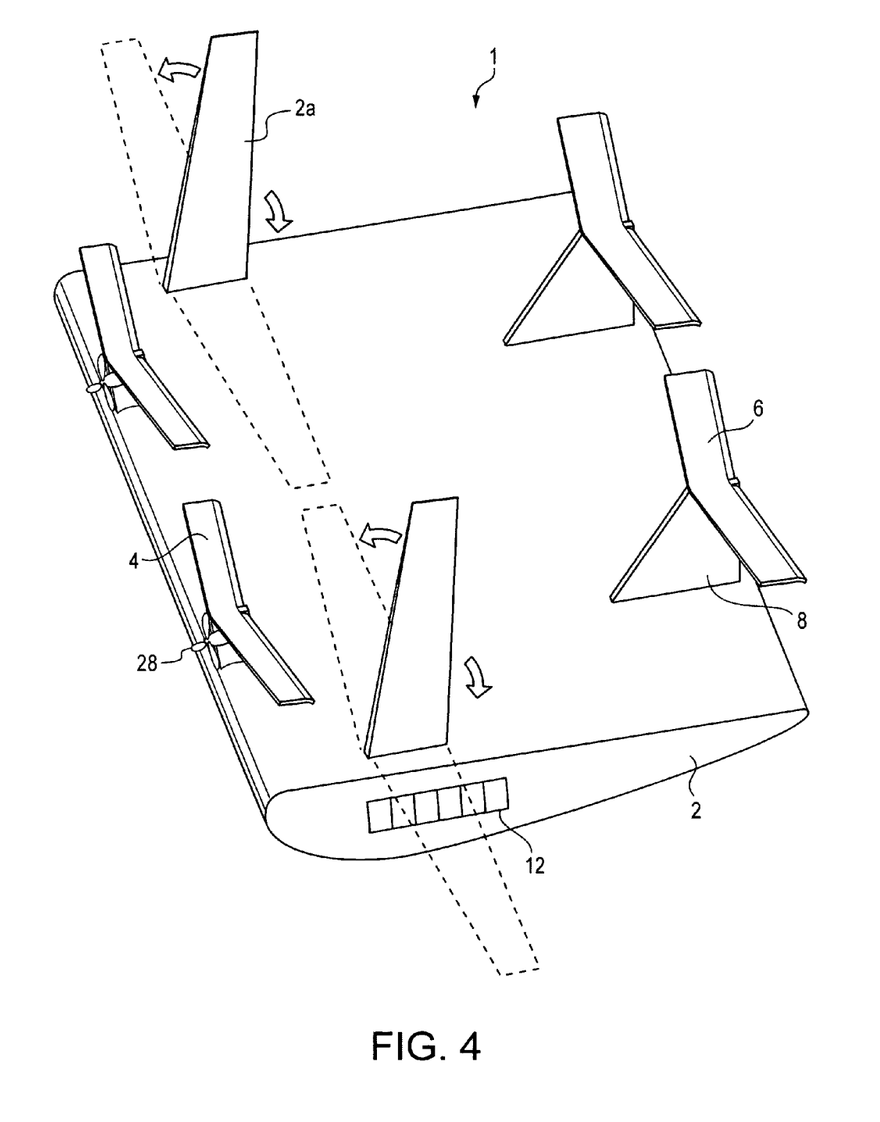
FIG. 4 shows a perspective view of another multi-wing, airfoil fuselage aircraft that is similar to that shown in FIG. 1 but which has foldable main wing extensions and differently configured and mounted auxiliary wings.

To address these roll stability concerns while providing more lift for this aircraft, main wing extensions 2a could be attached to each of the tips of the main wing 2. With such wing extensions, the span of the main wing would probably be smaller in order for such an aircraft to be able to use existing airport runways and the sweep on these wings could be either forward, back or neutral. These extensions 2a are provided with ailerons to enhance the aircraft's roll stability. Because the span of the main wing is so comparatively large, it may be advisable to engineer these main wing extensions 2a so that they have the capability to fold upward when the plane is on the ground and parked or taxing. See FIGS. 2-4.

Many alternative design possibilities exist for the fore 4 and aft 6 auxiliary wings, which have all the usual wing movable control surfaces 10, including slats, spoilers and flaps that are used to control the stability and maneuverability of the aircraft. The fore 4 and aft 6 auxiliary wings shown in FIGS. 1A-1C have approximate spans of 80 m and chords of 20 m and 10 m, respectively. Alternatively, to avoid having the aft auxiliary wing 6 be in the wash of the fore auxiliary wing 4, the fore wing can be constructed in two parts, each of which has a span of approximately 20 m and mounted near the ends of the main wing 2 so that there is an approximate distance of 40 m between these two fore auxiliary wings 4. A rear or aft auxiliary wing 6 of approximately 40 m in span is mounted so that the midpoint of this wing is located near the centerline of the main wing's trailing edge.

These auxiliary wing dimensions can be compared to that for a Boeing 747 aircraft which has a main wing that has approximately a span of 60 m and a chord of 8.5 m, for an Aspect Ratio of 7 and a wing surface area of 510 m$^2$ and an overall aircraft length of 70 m, with the aircraft's fuselage having a maximum width of approximately 7 m. With the proper jet engines, a Boeing 747 freighter aircraft (which has an empty weight of about 400,000 pounds) can have a maximum takeoff weight of about 900,000 lbs. as it accommodates a typical payload of about 200,000 lbs. and carries up to about 300,000 lbs. of jet fuel to cruise at speeds of 550 miles/hour (mph).

The main wing or airfoil fuselage shown in FIGS. 1A-1C has an exceedingly large surface area of 4,000 m$^2$; combined with the surface area of the auxiliary wings, the aircraft has a total wing surface area of approximately 6,400 m$^2$. Thus, it has approximately 12.5 times the wing surface area of a Boeing 747 aircraft which has about the same wing span as the aircraft disclosed herein. Such a large surface area is needed to provide enough lift for this comparatively low speed aircraft to carry its desired heavy payloads of over two million pounds (i.e., 52 twenty foot equivalent units (TEU) at an average weight of 38,500 pounds—this can be compared to the approximate 300,000 pound maximum payload capacity of the largest, current, air freight aircraft).

This massive, two million pound payload is accommodated in the present invention by creating within the main wing 2, for example, four side-by-side, span-width, oriented cargo channels 12, each of which has a cargo door 14 at either end so as to allow each of them to more easily load and unload up to thirteen, twenty foot long shipping containers (twenty foot equivalent units—TEUs) or five, fifty-three foot trailer bodies or containers per channel. Rails in the bottoms of these channels allow for relatively easy roll-on and roll-off cargo handling.

Construction techniques for these channels include utilizing trusses located between the cargo channels to form the wing's load bearing wing spars, and the application of space frame technology that can include temporary framing between the containers to allow the wings to be made stiffer and therefore have less thickness and therefore lower frontal drag. The mid-point of these channels is located at a distance from the wing's front edge that is approximately one fourth of the wing's chord length which coincides with the center of lift for the average wing.

It was previously noted that the present aircraft has a main wing 2 or airfoil fuselage that has a quite large thickness of 5 m. Since the tips of these wings can also be made flat, they present some unique opportunities for the present aircraft. For example, with the addition of the appropriate joining mechanisms to the wings tips, it may be possible to join several of these aircraft together wingtip to wingtip after they are airborne. Five such aircraft joined together would effectively have a main wing with a span of 400 m, a chord of 50 m and an Aspect Ratio of 8. It would have better pitch stability and probably have greater fuel efficiency than the individual aircraft. If additional instrumentation was provided that allowed the individual aircraft's control systems to be jointly operated, the crews of the individual aircraft could share in the task of piloting the joined aircraft when they are in the air for extended periods of over 40 hours as they travel at speeds of up to 150 mph to cover distances of over 6,000 miles.

This main wing 2 is given either symmetrical or reverse camber in order to maximize its angle of attack on take-off and landing. Leading edge slots can be provided in the main wing to help provide lift when the aircraft is near the ground. The main wing 2 cannot have flaps deployed near the ground without causing pitch instability problems, so flaps are not installed on the main wing 2. Because the main wing has a comparatively small AR, a significant amount of air will flow around its tips thereby reducing its effective lift. Wing fences 16 on the top of the main wing 2, situated possibly both between the vertical fins and on the wing's tips can be used to help reduce this phenomena. Similarly, protuberances 18 situated near the main wing's leading edge are utilized to reduce the significant frontal drag produced by the main wing's appreciable thickness.

The vertical fins 8 that are used in mounting the aircraft's auxiliary wings are provided with rudders 20 for assistance is controlling the direction and turning of the aircraft. These rudders could be either mounted on the rear of the fins or in specialized windows/openings that are created in the middle of the body of the fins. Because of the main wing's small AR, these rudders cannot be used near the ground for fear of one of the wing tips striking the ground.

When the aircraft turns near the ground, the outside wing is moving faster than the inside wing as a result of the engine nearest the outside wing having been given more power. Therefore, in this situation, the outside wing would typically have greater lift and could potentially cause the plane to roll which could result in a wing tip touching the ground. To prevent this, spoilers 22 are situated on the wings that deploy automatically on the faster moving wing so as to compensate for the outside wing's increased lift and thereby keep the aircraft's wings level. Additionally, the auxiliary wings 4, 6 are provided with ailerons 24 to further assist in controlling the turning of the aircraft.

Pitch and angle of attack control for the main wing 2 are provided by the auxiliary wings 4, 6 which have pivot mounts 26 or pivot mounting means that pivotally attach them to the vertical fins 8. As shown in FIG. 1B, these mounts 26 extend over the full chord length of these auxiliary wings 4,6 so that they can move the whole or entire extent of these wings so as to allow the angles of attack of the auxiliary wings 4, 6 to be adjusted and changed in flight (e.g., flare for landing and rotate for take-off).

The aircraft's engines 28 may be mounted in various ways. In FIGS. 1A-1C they are shown mounted on the vertical fins 8 of the fore auxiliary wing 4 so that they end up being situated approximately in front of the main wing 2 so that they enhance the main wing's lifting ability. A number of engines are suitable for this application and include even a more fuel-efficient, constant speed diesel engine with constant speed propellers.

The landing gear for this aircraft is somewhat unusual in that it consists of both the normal main landing gear 30 and what we'll refer to herein as a second set of stabilizing landing gear 32. This second set of landing gear is added specifically to address the potential "ground effect," roll instability problems of the aircraft (i.e., because of the main wing's considerable size and low AR, the closer it is to the ground the greater the danger of it encountering roll instability problems and the possibility of a wing tip striking the ground). The stabilizing landing gear 30 consists of telescoping pieces 34 that allow it to extend for landing to a length of as much as 30-40 feet to accommodate the aircraft's initial touch-down while the main wing is still at a sufficient height above the ground to minimize any slight roll instability perturbations that the aircraft might encounter.

Once landed, the stabilizing landing gear 32 shortens so that the aircraft can sit on its normal landing gear 30 for loading and unloading cargo, etc. Before take-off, the front stabilizing landing gear 32 is again lengthened so as to raise the main wing's leading edge into the best possible angle of attack for take-off. The stabilizing landing gear 32 is equipped with large diameter (e.g., 3 m) wheels that can roll over most obstacles and do not dig into the ground on touch-down.

The suspension of the stabilizing gear is controlled to remain at maximum stiffness until all the wheels of the stabilizing gear 32 make ground contact. After the aircraft is on all the stabilizing gear (at flying speed and ten meters above the runway), air-brakes deploy. As the craft losses airspeed and lift, the stabilizing gear 32 is controlled to retract evenly until the weight settles on the main landing gear 30. Many design configurations would be suitable for this landing gear (e.g., 6 sets of 2×4 stabilizing landing wheels, equally span-width distributed in both front and rear locations under the main wing; and 18 sets of 2×2 normal landing wheels distributed around the larger stabilizing landing gears).

In addition to the standard instrumentation, this aircraft is provided with multiple air pressure sensors that are located beneath and around the main wing or airfoil fuselage 2. The readings from these sensors are fed into a specialized "ground effect" automated control system 36 that is used to regulate the operation and positioning of aircraft's control surfaces 10 so that they can maintain the stability of the aircraft when it is flying near the ground/ocean in its "ground effect" mode of operation. The design and means for developing such aircraft automated control systems are not described herein since such technology is considered well known in the art. Detailed ground, topography scanning instruments are also provided and utilized to provide further inputs into this control system since irregularities in the ground topography can possibly affect the stability of the aircraft when it is flying in "ground effect."

Construction of the aircraft disclosed herein can be accomplished with current technology. The main wing 2 could be constructed at relatively low cost as a light weight structure with a space frame for great strength and flexibility. Twenty space frames of 4 meter width could be joined to assemble a main wing having an 80 meter span. Wide and narrower cargo main wings 2 could be made on the same assembly tool. The auxiliary wings and their control surfaces are current standard items. The only technologically new items in the aircraft disclosed herein would be its stabilizing landing gear and its controls. The construction of these items is well within the current abilities of aircraft manufacturers.

The aircraft's flight deck and crew relief area is the only space that would need to be pressurized. This aircraft's cargo area can be pressurized with a non structural balloon at much lower cost than the cargo areas of current air freighters. New cargo containers could also be developed and rated for high altitude use.

The aircraft disclosed herein is designed to fit on current large airport runways, utilizing these facilities at scheduled times when there is little or no other air traffic. Specialized container loading and unloading facilities may need to be built at to-be-utilized airports; facilities similar to those found in specialized sea-borne container ports and those ports equipped with specialized roll-on/roll-off facilities. Ground tugs, possibly wheeled locomotive engines, could connect to the aircraft's stabilizing landing gear wheel sets to move the aircraft when they are on the ground. Such tugs might also add power for take-off to extend the aircraft's telescoping stabilizing landing gear.

Figure 5:
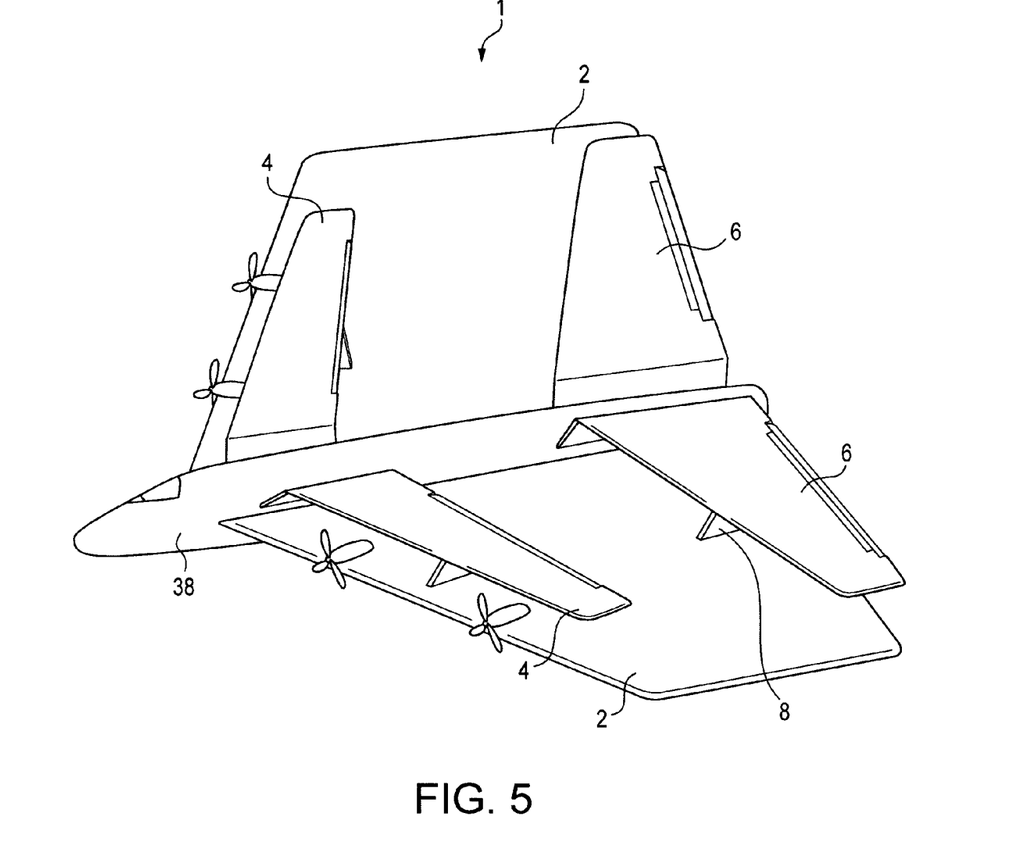
FIG. 5 shows a perspective view of another airfoil fuselage aircraft similar to that shown in FIG. 1 but which includes a more typical, cylindrical, streamlined fuselage.

It should be recognized that the present invention is capable of existing in many forms of embodiments and of being practiced and carried out in various ways. For example, it is possible to add a more typical cylindrical, streamlined, pressurizeable fuselage 38 to the aircraft's main wing 2. See FIG. 5. Such an aircraft could be used for many purposes (e.g., the transport of passengers rather than cargo). In such a configuration, the present invention could conceivably compete with high speed railroads. It could carry passengers seated in bus type bodies. Self contained passenger pods, including baggage and food service, could be transferred from the aircraft to the airport terminal or onto light or heavy rail, local or intercity bus substructures. A number of such especially designed pods could load as many as fourteen hundred passengers in under 30 minutes onto a ConcordLift™ aircraft that has this additional cylindrical fuselage.

Additional main wing fuselage configurations could easily be manufactured for roll-on/roll-off transport such as automobile and assorted multiple military uses (e.g., heavy weapons transport; operations command centers). An appropriately configured ConcordLift™ aircraft with jet engines could also serve as a high speed, high altitude (50,000 ft.) launch platform from which modified versions of current rockets could be used to launch payloads into space at considerable saving in terms of cost per pound of payload launched.

The foregoing is considered as illustrative only of the principles of the present invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as set forth in the hereinafter claims to the present invention.

I claim:

1. A multi-wing, airfoil fuselage aircraft capable of flying in a ground-effect mode, said aircraft comprising:
   a main, airfoil fuselage wing having a centerline and top, bottom, front, rear and wing tip surfaces and a specified span length between said wing tips and a specified chord length between said front and rear surfaces, and said top and bottom surfaces configured so as to yield a camber for said main airfoil fuselage wing, that is selected from the group consisting of symmetrical and reverse chamber,
   a fin that connects and extends vertically from said main airfoil fuselage wing top surface,
   a pivot mounting means affixed to said fin,
   an angle-of-attack adjustable, auxiliary wing that connects to said pivot mounting means, wherein said pivot mounting means adapted to allow the entire auxiliary wing to be moved so as to adjust and change the angle-of-attack of said auxiliary wing with respect to said main airfoil fuselage wing centerline,
   a main landing gear that connects to the bottom surface of said main airfoil fuselage wing,
   a stabilizing landing gear having telescoping pieces that are configured to connect to the bottom surface of said main airfoil fuselage wing and allow said stabilizing landing gear to extend to accommodate the initial touchdown of said aircraft and to raise said main, airfoil fuselage wing into a desired angle of attack for take-off,
   a plurality of control surfaces movably affixed to said auxiliary wing and fin, said control surfaces adapted to control the stability and maneuverability of said aircraft, and
   a ground-effect control system that is adapted to control the operation and movement of said control surfaces when said aircraft is flying at relatively low speeds in a ground-effect mode for extended periods of time.

2. The multi-wing, airfoil fuselage aircraft as recited in claim 1, wherein said auxiliary wing including a fore and an aft auxiliary wing.

3. The multi-wing, airfoil fuselage aircraft as recited in claim 1, wherein said main airfoil fuselage wing having therein a span width oriented, cargo channel and a cargo door that provides access to said cargo channel.

4. The multi-wing, airfoil fuselage aircraft as recited in claim 2, wherein said main airfoil fuselage wing having therein a span width oriented, cargo channel and a cargo door that provides access to said cargo channel.

5. The multi-wing, airfoil fuselage aircraft as recited in claim 1, further comprising a wing extension that extends from each of said main, airfoil fuselage wing tip surfaces.

6. The multi-wing, airfoil fuselage aircraft as recited in claim 2, further comprising a wing extension that extends from each of said main, airfoil fuselage wing tip surfaces.

7. The multi-wing, airfoil fuselage aircraft as recited in claim 3, further comprising a wing extension that extends from each of said main, airfoil fuselage wing tip surfaces.

8. The multi-wing, airfoil fuselage aircraft as recited in claim 1, wherein said camber of said main, airfoil fuselage wing is chosen from the group of symmetrical or reverse cambers.

9. The multi-wing, airfoil fuselage aircraft as recited in claim 1, further comprising a cylindrical, streamlined fuselage that attaches to said main, airfoil fuselage wing.

10. The multi-wing, airfoil fuselage aircraft as recited in claim 2, further comprising a cylindrical, streamlined fuselage that attaches to said main, airfoil fuselage wing.

11. A multi-wing aircraft capable of flying in a ground-effect mode, said aircraft comprising:
- a main wing having a centerline and top, bottom, front, rear and wing tip surfaces and a specified span length between said wing tips and a specified chord length between said front and rear surfaces, and said top and bottom surfaces configured so as to yield a camber for said main wing, that is selected from the group consisting of symmetrical and reverse camber,
- a fin that connects and extends vertically from said main wing top surface,
- a pivot mounting means affixed to said fin,
- an angle-of-attack adjustable, auxiliary wing that connects to said pivot mounting means, wherein said pivot mounting means adapted to allow the entire auxiliary wing to be moved so as to adjust and change the angle-of-attack of said auxiliary wing with respect to said main airfoil fuselage wing centerline,
- a main landing gear that connects to the bottom surface of said main wing,
- a stabilizing landing gear having telescoping pieces that are configured to connect to the bottom surface of said main wing and allow said stabilizing landing gear to extend to accommodate the initial touch-down of said aircraft and to raise said main wing into a desired angle of attack for take-off,
- a plurality of control surfaces movably affixed to said auxiliary wing and fin, said control surfaces adapted to control the stability and maneuverability of said aircraft, and
- a ground-effect control system that is adapted to control the operation and movement of said control surfaces when said aircraft is flying at a relatively low speeds in a ground-effect mode for extended periods of time.

12. The multi-wing aircraft as recited in claim 11, wherein said auxiliary wing including a fore and an aft auxiliary wing.

13. The multi-wing aircraft as recited in claim 11, further comprising a wing extension that extends from each of said main wing tip surfaces.

14. The multi-wing aircraft recited in claim 12, further comprising a wing extension that extends from each of said main, airfoil fuselage wing tip surfaces.

15. The multi-wing aircraft as recited in claim 11, wherein said camber of said main wing is chosen from the group of symmetrical or reverse cambers.

16. The multi-wing aircraft as recited in claim 12, wherein said camber of said main wing is chosen from the group of symmetrical or reverse cambers.

17. The multi-wing aircraft as recited in claim 13, wherein said camber of said main wing is chosen from the group of symmetrical or reverse cambers.

18. The multi-wing aircraft as recited in claim 11, further comprising a cylindrical, streamlined fuselage that attaches to said main wing.

19. The multi-wing aircraft as recited in claim 12, further comprising a cylindrical, streamlined fuselage that attaches to said main wing.

20. The multi-wing aircraft as recited in claim 13, further comprising a cylindrical, streamlined fuselage that attaches to said main wing.

* * * * *